US012488934B2

(12) United States Patent
Okumura et al.

(10) Patent No.: US 12,488,934 B2
(45) Date of Patent: Dec. 2, 2025

(54) MARK-INCLUDING INDUCTOR AND MARK-INCLUDING LAMINATED SHEET

(71) Applicant: NITTO DENKO CORPORATION, Osaka (JP)

(72) Inventors: Keisuke Okumura, Osaka (JP); Yoshihiro Furukawa, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 520 days.

(21) Appl. No.: 17/174,997

(22) Filed: Feb. 12, 2021

(65) Prior Publication Data

US 2021/0257149 A1 Aug. 19, 2021

(30) Foreign Application Priority Data

Feb. 17, 2020 (JP) ................................ 2020-024307
Jan. 7, 2021 (JP) ................................ 2021-001687

(51) Int. Cl.
*H01F 27/28* (2006.01)
*H01F 17/00* (2006.01)

(52) U.S. Cl.
CPC ..... *H01F 27/2866* (2013.01); *H01F 17/0013* (2013.01); *H01F 2017/0066* (2013.01)

(58) Field of Classification Search
CPC ......... H01F 27/2866; H01F 2017/0066; H01F 17/0013
USPC .......................................................... 336/200
See application file for complete search history.

(56) References Cited

U.S. PATENT DOCUMENTS 5,240,671 A * 8/1993 Carey ................. C04B 41/4578 264/633
5,552,756 A 9/1996 Ushiro
10,475,569 B2 * 11/2019 Yatabe ................ H01F 27/2804
10,748,696 B2 8/2020 Shibuya et al.
10,998,126 B2 5/2021 Nishikawa et al.
11,551,845 B2 1/2023 Hirukawa
2003/0201862 A1 * 10/2003 Arntz ..................... B60M 7/003 336/174
2007/0102805 A1 5/2007 Kim et al.
2009/0108958 A1 * 4/2009 Hadano ................ H03H 7/1725 333/175
2010/0026440 A1 * 2/2010 Lim .................... H01F 17/0033 336/200

(Continued)

FOREIGN PATENT DOCUMENTS

CN 105679490 A * 6/2016 ......... H01F 17/0013
CN 109659113 A 4/2019

(Continued)

OTHER PUBLICATIONS

Non-Final Office Action which was issued on Sep. 11, 2023, in connection with U.S. Appl. No. 17/174,993.

(Continued)

*Primary Examiner* — Shawki S Ismail
*Assistant Examiner* — Joselito S. Baisa
(74) *Attorney, Agent, or Firm* — Edwards Neils LLC; Jean C. Edwards, Esq.

(57) ABSTRACT

A mark-including inductor includes a sheet-shaped inductor including a plurality of wirings and a magnetic layer embedding the plurality of wirings, and a mark disposed at one side in a thickness direction of the inductor and/or formed in the magnetic layer.

18 Claims, 5 Drawing Sheets

(56) References Cited

U.S. PATENT DOCUMENTS

| | | | | |
|---|---|---|---|---|
| 2011/0017502 | A1* | 1/2011 | Hardin | H05K 1/0251 174/260 |
| 2013/0063238 | A1 | 3/2013 | Lim et al. | |
| 2016/0163442 | A1* | 6/2016 | Yoon | H01F 27/085 336/200 |
| 2017/0341341 | A1 | 11/2017 | Kim et al. | |
| 2017/0345535 | A1 | 11/2017 | Kim et al. | |
| 2017/0346165 | A1 | 11/2017 | Kim et al. | |
| 2017/0352467 | A1 | 12/2017 | Kakiuchi et al. | |
| 2018/0061551 | A1 | 3/2018 | Kondou et al. | |
| 2018/0204663 | A1* | 7/2018 | Lee | H01F 17/0013 |
| 2018/0230040 | A1 | 8/2018 | Umemoto et al. | |
| 2018/0261377 | A1* | 9/2018 | Kim | H01F 27/324 |
| 2018/0277293 | A1 | 9/2018 | Ito et al. | |
| 2019/0115127 | A1* | 4/2019 | Iso | H01F 27/255 |
| 2019/0164685 | A1* | 5/2019 | Hirukawa | H01F 27/292 |
| 2019/0206611 | A1 | 7/2019 | Matsumoto et al. | |
| 2019/0221365 | A1 | 7/2019 | Cappabianca et al. | |
| 2019/0244743 | A1 | 8/2019 | Hirai et al. | |
| 2019/0250447 | A1 | 8/2019 | Abe et al. | |
| 2021/0157192 | A1 | 5/2021 | Abe et al. | |
| 2021/0259111 | A1 | 8/2021 | Okumura et al. | |
| 2021/0265097 | A1* | 8/2021 | Yoshioka | H01F 27/2804 |
| 2022/0165482 | A1 | 5/2022 | Furukawa et al. | |
| 2022/0229324 | A1 | 7/2022 | Abe et al. | |
| 2022/0406522 | A1 | 12/2022 | Cappabianca et al. | |
| 2023/0015749 | A1 | 1/2023 | Iso et al. | |
| 2023/0170135 | A1* | 6/2023 | Kawaguchi | H01F 17/04 336/199 |

FOREIGN PATENT DOCUMENTS

| | | | | | |
|---|---|---|---|---|---|
| CN | 107785153 | B | * | 9/2021 | H01F 17/0013 |
| EP | 2963094 | A1 | | 1/2016 | |
| JP | 61-162002 | U | | 10/1986 | |
| JP | 62-94608 | A | | 6/1987 | |
| JP | 62-94608 | U | | 6/1987 | |
| JP | 02-094506 | A | | 4/1990 | |
| JP | H02142104 | A | * | 5/1990 | |
| JP | 04-028756 | A | | 1/1992 | |
| JP | H04-052190 | A | | 2/1992 | |
| JP | 2003178923 | A | * | 6/2003 | |
| JP | 2003-282328 | A | | 10/2003 | |
| JP | 2003-318508 | A | | 11/2003 | |
| JP | 2003332141 | A | * | 11/2003 | |
| JP | 2003-347694 | A | | 12/2003 | |
| JP | 2014-165363 | A | | 9/2014 | |
| JP | 2017-216409 | A | | 12/2017 | |
| JP | 2018-029169 | A | | 2/2018 | |
| JP | 2018-037516 | A | | 3/2018 | |
| JP | 2018-182201 | A | | 11/2018 | |
| JP | 2019-075401 | A | | 5/2019 | |
| JP | 2019-121780 | A | | 7/2019 | |
| JP | 2019-134141 | A | | 8/2019 | |
| JP | 2019-139073 | A | | 8/2019 | |
| JP | 2019-160919 | A | | 9/2019 | |
| JP | 2019-165221 | A | | 9/2019 | |
| JP | 2019-220618 | A | | 12/2019 | |
| JP | 2020-150057 | A | | 9/2020 | |
| JP | 2021-129075 | A | | 9/2021 | |
| KR | 10-2007-0048330 | A | | 5/2007 | |
| KR | 10-2019-0032474 | A | | 3/2019 | |
| TW | 201802837 | A | | 1/2018 | |
| TW | 201831420 | A | | 9/2018 | |
| WO | 2017/104309 | A1 | | 6/2017 | |

OTHER PUBLICATIONS

Office Action, issued by the Japanese Patent Office on Jan. 9, 2024, in connection with Japanese Patent Application No. 2020-024312.

Final Office Action which was issued on Mar. 13, 2024, in connection with U.S. Appl. No. 17/174,993.

Office Action issued by the Taiwanese Intellectual Property Office on Nov. 20, 2024, in connection with Taiwanese Patent Application No. 110105347.

Office Action issued by the Taiwanese Intellectual Property Office on Nov. 22, 2024, in connection with Taiwanese Patent Application No. 110105349.

Office Action issued by the Korean Intellectual Property Office on Feb. 5, 2025, in connection with Korean Patent Application No. 10-2021-0019020.

Office Action issued by the Korean Intellectual Property Office on Feb. 5, 2025, in connection with Korean Patent Application No. 10-2021-0019028.

Decision of Dismissal of Amendment issued by the Japanese Patent Office on Nov. 28, 2024, in connection with Japanese Patent Application No. 2020-024312.

Decision of Refusal issued by the Japanese Patent Office on Nov. 28, 2024, in connection with Japanese Patent Application No. 2020-024312.

Office Action, issued by the Japanese Patent Office on Jul. 30, 2024, in connection with Japanese Patent Application No. 2021-001687.

Office Action issued by the Korean Intellectual Property Office on Apr. 12, 2025, in connection with Korean Patent Application No. 10-2021-0019020.

Office Action issued by the Korean Intellectual Property Office on Apr. 12, 2025, in connection with Korean Patent Application No. 10-2021-0019028.

Office Action, issued by the Japanese Patent Office on Jul. 2, 2024, in connection with Japanese Patent Application No. 2020-024312.

Reconsideration Report by Examiner issued by the Japanese Patent Office on Mar. 3, 2025, in connection with Japanese Patent Application No. 2021-001687.

Office Action, issued by the Japanese Patent Office on Oct. 22, 2024, in connection with Japanese Patent Application No. 2021-001687.

Reconsideration Report, issued by the Japanese Patent Office on Jun. 19, 2025, in connection with Japanese Patent Application No. 2020-024312.

* cited by examiner 6
5
15
6
7
5
5
7
6
5
6
13
Adjacent direction
(Plane direction)
Extending direction
(Plane direction)

6
4
3
5
6
4
7
7
5
5
4
6
4
L
5
6
1

6
4
16
3
16
5
6
4
7
7
5
5
4
6
4
16
5
16
6
1

MARK-INCLUDING INDUCTOR AND MARK-INCLUDING LAMINATED SHEET

CROSS REFERENCE TO RELATED APPLICATION

The present application claims priority from Japanese Patent Applications No. 2020-024307 filed on Feb. 17, 2020 and No. 2021-001687 filed on Jan. 7, 2021, the contents of which are hereby incorporated by reference into this application.

TECHNICAL FIELD

The present invention relates to a mark-including inductor and a mark-including laminated sheet.

BACKGROUND ART

Conventionally, it has been known that a sheet-shaped inductor is mounted on an electronic device. For example, an inductor including a wiring, and a magnetic layer covering the wiring has been proposed (ref: for example, Patent Document 1 below).

PRIOR ART DOCUMENT

Patent Document

[Patent Document 1] Japanese Unexamined Patent Publication No. 2019-220618

SUMMARY OF THE INVENTION

Problems to be Solved by the Invention

However, a via for electrically connecting the wiring to the electronic device may be formed in the magnetic layer. At that time, in order to accurately recognize the position of the wiring when viewed from the top, it is necessary to align the inductor. However, in Patent Document 1, there is a problem that the inductor cannot be accurately aligned.

Further, as for the inductor to be mounted on the electronic device, there is a demand that the user wishes to acquire information about it before mounting. However, the inductor of Patent Document 1 does not include the above-described information. Therefore, there is a problem that the user cannot obtain the information of the inductor in advance.

The present invention provides a mark-including inductor and a mark-including laminated sheet that are capable of being accurately aligned to form a via, or reliably obtaining information about a product.

Solution to the Problems

The present invention (1) includes a mark-including inductor including a sheet-shaped inductor including a plurality of wirings and a magnetic layer embedding the plurality of wirings, and a mark disposed at one side in a thickness direction of the inductor and/or formed in the magnetic layer.

Since the mark-including inductor includes the mark, it is possible to form a via by aligning the mark-including inductor based on the mark, or reliably obtain information by recognizing the information about a product based on the mark.

The present invention (2) includes the mark-including inductor described in (1), wherein the mark is spaced apart from the wiring when projected in the thickness direction.

In the mark-including inductor, the mark is spaced apart from the wiring. That is, the mark is not oppositely disposed at one side in the thickness direction of the wiring. Therefore, the mark is formed without positional deviation based on the presence of the wiring. Therefore, the mark-including inductor can be more accurately aligned, and also more reliably obtain the information about the product.

The present invention (3) includes a mark-including laminated sheet including the mark-including inductor having a mark disposed at one side in a thickness direction of an inductor described in (1) or (2), and a mark layer disposed on one surface in the thickness direction of the inductor and having the mark disposed.

Since the mark-including laminated sheet includes the mark, it is possible to form a via by aligning the mark-including laminated sheet based on the mark, or reliably obtain information by recognizing the information about the product based on the mark.

Furthermore, since the mark-including laminated sheet includes the mark laser, it is possible to reliably include the mark.

The present invention (4) includes the mark-including laminated sheet described in (3), wherein a material for the mark layer is a resin composition.

In the mark-including laminated sheet, since the material for the mark layer is the resin composition, it is easy to form the mark.

The present invention (5) includes the mark-including laminated sheet described in (4), wherein the resin composition is a thermosetting resin composition, and satisfies at least one test of the following test (a) to test (e).

Test (a): the mark-including laminated sheet is trimmed into a 3 cm square piece to fabricate a sample, and the relative permeability μ1 thereof at a frequency of 10 MHz is determined. Thereafter, the sample is immersed in 200 mL of copper sulfate plating solution containing 66 g/L of copper sulfate pentahydrate, 180 g/L of sulfuric acid concentration, 50 ppm of chlorine, and Top Lutina alpha at 25° C. for 120 minutes, and thereafter, the relative permeability μ2 of the sample at a frequency of 10 MHI is determined. By the following formula, a rate of change of the magnetic permeability before and after the immersion is determined. As a result, the rate of change of the magnetic permeability of the sample is 5% or less.

$$\text{Rate of Change of Magnetic Permeability (\%)}=|\mu1-\mu2|/\mu1\times100$$

Test (b): the mark-including laminated sheet is trimmed into a 3 cm square piece to fabricate a sample, and the relative permeability μ3 thereof at a frequency of 10 MHz is determined. Thereafter, the sample is immersed in 200 mL of an acid active aqueous solution containing 55 g/L of sulfuric acid at 25° C. for 1 minute, and thereafter, the relative permeability μ4 of the sample at a frequency of 10 MHz is determined. By the following formula, a rate of change of the magnetic permeability before and after the immersion is determined. As a result, the rate of change of the magnetic permeability of the sample is 5% or less.

$$\text{Rate of Change of Magnetic Permeability (\%)}=|\mu3-\mu4|/\mu3\times100$$

Test (c): the mark-including laminated sheet is trimmed into a 3 cm square piece to fabricate a sample, and the relative permeability μ5 thereof at a frequency of 10 MHz is determined. Thereafter, the sample is immersed in 200 mL of Reduction Solution Securiganth P manufactured by Atotech Japan K.K. at 45° C. for 5 minutes, and thereafter, the relative permeability μ6 of the sample at a frequency of 10 MHz is determined. By the following formula, a rate of change of the magnetic permeability before and after the immersion is determined. As a result, the rate of change of the magnetic permeability of the sample is 5% or less.

$$\text{Rate of Change of Magnetic Permeability (\%)}=|\mu 5-\mu 6|/\mu 5\times 100$$

Test (d): the mark-including laminated sheet is trimmed into a 3 cm square piece to fabricate a sample, and the relative permeability μ7 thereof at a frequency of 10 MHz is determined. Thereafter, the sample is immersed in 200 mL, of Concentrate Compact CP manufactured by Atotech Japan K.K. at 80° C. for 15 minutes, and thereafter, the relative permeability μ8 of the sample at a frequency of 10 MHz is determined. By the following formula, a rate of change of the magnetic permeability before and after the immersion is determined. As a result, the rate of change of the magnetic permeability of the sample is 5% or less.

$$\text{Rate of Change of Magnetic Permeability (\%)}=|\mu 7-\mu 8|/\mu 7\times 100$$

Test (e): the mark-including laminated sheet is trimmed into a 3 cm square piece to fabricate a sample, and the relative permeability μ9 thereof at a frequency of 10 MHz is determined. Thereafter, the sample is immersed in 200 mL of Swelling Dip Securiganth P manufactured by Atotech Japan K.K. at 60° C. for 5 minutes, and thereafter, the relative permeability μ10 of the sample at a frequency of 10 MHz is determined. By the following formula, a rate of change of the magnetic permeability before and after the immersion is determined. As a result, the rate of change of the magnetic permeability of the sample is 5% or less.

$$\text{Rate of Change of Magnetic Permeability (\%)}=|\mu 9-\mu 10|/\mu 9\times 100$$

Since the mark-including laminated sheet satisfies at least one test of the test (a) to test (e), it is excellent in stability with respect to process processing using a chemical solution.

The present invention (6) includes the mark-including inductor described in (1), wherein the mark is a through hole penetrating the magnetic layer in the thickness direction.

In the mark-including inductor, when an insulating layer is disposed in the magnetic layer, it is possible to ensure the visibility from the other side in the thickness direction.

Effect of the Invention

The mark-including inductor and the mark-including laminated sheet of the present invention can be accurately aligned to form a via, or reliably obtain information about a product.

BRIEF DESCRIPTION OF THE DRAWINGS

FIG. 1A illustrating a laminated sheet.

FIG. 1B illustrating a mark-including laminated sheet, and

FIG. 1C illustrating a mark-including laminated sheet in which a via is formed.

FIG. 2A illustrating an inductor,

FIG. 2B illustrating a laminated sheet,

FIG. 2C illustrating a mark-including laminated sheet, and

FIG. 2D illustrating a mark-including laminated sheet in which a via is formed.

EMBODIMENT OF THE INVENTION

One Embodiment

Figures 1A, 1B, 1C:
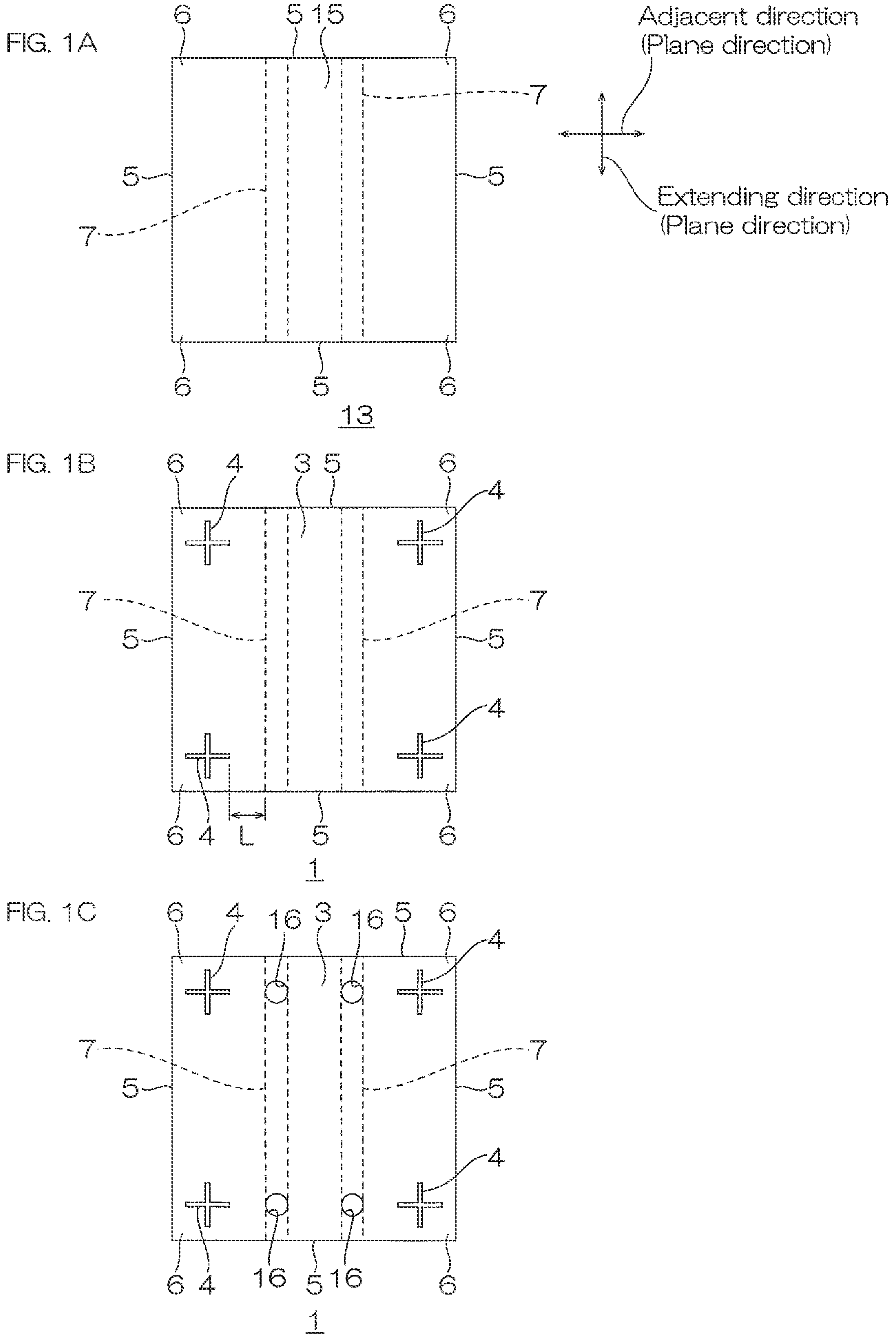
FIGS. 1A to 1C show plan views for illustrating a method for producing one embodiment of a mark-including laminated sheet of the present invention.

One embodiment of a mark-including laminated sheet of the present invention is described with reference to FIGS. 1B and 2C.

A mark-including laminated sheet 1 has a predetermined thickness, and has a sheet shape extending in a plane direction perpendicular to a thickness direction. The mark-including laminated sheet 1 has a generally rectangular shape when viewed from the top. The mark-including laminated sheet 1 includes a sheet-shaped inductor 2, a mark layer 3, and a mark 4.

The inductor 2 has the same outer shape as the mark-including laminated sheet 1 when viewed from the top. Specifically, the inductor 2 has a generally rectangular shape including four sides 5 when viewed from the top.

Further, the inductor 2 includes a plurality of wirings 7 and a magnetic layer 8.

The plurality of wirings 7 are adjacent to each other at spaced intervals. The plurality of wirings 7 are parallel with each other. The plurality of wirings 7 extend along a direction perpendicular to a direction in which the plurality of wirings 7 are adjacent to each other and the thickness direction. A shape, a dimension, a configuration, a material, and a formulation (filling rate, content ratio, or the like) of the wiring 7 are, for example, described in Japanese Unexamined Patent Publication No. 2019-220618 or the like. Preferably, the wiring 7 has a generally circular shape when viewed in the cross section along a direction perpendicular to a direction along the wiring 7, and the lower limit of the diameter thereof is, for example, 25 μm, and the upper limit of the diameter thereof is, for example, 2,000 μm. The wiring 7 preferably includes a conducting wiring made of a conductor, and an insulating film covering a peripheral surface of the conducting wiring. The lower limit of an interval between the wirings 7 adjacent to each other is, for example, 10 μm, preferably 50 μm, and the upper limit of an interval between the wirings 7 adjacent to each other is, for example, 5,000 μm, preferably 3,000 μm. The upper limit of a ratio (diameter/interval) of the diameter of the wiring 7 to the interval between the wirings 7 adjacent to each other is, for example, 200, preferably 50, and the lower limit thereof is, for example, 0.01, preferably 0.1.

The magnetic layer 8 improves the inductance of the mark-including laminated sheet 1. The magnetic layer 8 has the same outer shape as the inductor 2 when viewed from the top. The magnetic layer 8 has a plate shape extending in the plane direction. Further, the magnetic layer 8 embeds the plurality of wirings 7 when viewed in the cross-sectional view. The magnetic layer 8 has a one surface 9, an other surface 10, and an inner peripheral surface 11.

The one surface 9 forms one surface in the thickness direction of the magnetic layer 8.

The other surface 10 forms the other surface in the thickness direction of the magnetic layer 8. The other surface 10 is spaced apart from the other side in the thickness direction of the one surface 9.

The inner peripheral surface 11 is spaced apart from the one surface 9 and the other surface 10 in the thickness direction. The inner peripheral surface 11 is located between the one surface 9 and the other surface 10 in the thickness direction. The inner peripheral surface 11 is located between two outer-side surfaces 18 facing each other in a direction in which the plurality of wirings 7 are adjacent to each other. The inner peripheral surface 11 is in contact with the outer peripheral surface of the wiring 7.

The magnetic layer 8 contains a binder and magnetic particles Specifically, a material for the magnetic layer 8 is a magnetic composition containing the binder and the magnetic particles.

Examples of the binder include thermoplastic resins such as an acrylic resin and thermosetting resins such as an epoxy resin composition. The acrylic resin includes, for example, a carboxyl group-including acrylic acid ester copolymer. The epoxy resin composition includes, for example, an epoxy resin (cresol novolac epoxy resin or the like) as a main agent, a curing agent for an epoxy resin (phenol resin or the like), and a curing accelerator for an epoxy resin (imidazole compound or the like). As the binder, the thermoplastic resin and the thermosetting resin can be used alone or in combination of two or more, and preferably, the thermoplastic resin and the thermosetting resin are used in combination of two or more. A volume ratio of the binder in the magnetic composition is a remaining portion of a volume ratio of the magnetic particles to be described later.

The magnetic particles are, for example, dispersed in the binder. In the present embodiment, the magnetic particles have, for example, a generally flat shape. The generally flat shape includes a generally plate shape. The magnetic particles may have a generally spherical shape or a generally needle shape Preferably, the magnetic particles have a generally flat shape.

When the magnetic particles have a generally flat shape, the lower limit of a flat ratio (flat degree) of the magnetic particles is, for example, 8, preferably 15, and the upper limit thereof is, for example, 500, preferably 450. The flat ratio is, for example, calculated as an aspect ratio obtained by dividing a median diameter of the magnetic particles by an average thickness of the magnetic particles.

The lower limit of the median diameter of the magnetic particles is, for example, 3.5 μm, preferably 10 μm, and the upper limit thereof is, for example, 200 μm, preferably 150 μm. When the magnetic particles have a generally flat shape, the lower limit of the average thickness of the magnetic particles is, for example, 0.1 μm, preferably 0.2 μm, and the upper limit thereof is, for example, 3.0 μm, preferably 2.5 μm.

Further, a material for the magnetic particles is a metal. Examples of the metal include magnetic bodies such as a soft magnetic body and a hard magnetic body. Preferably, from the viewpoint of ensuring excellent inductance, a soft magnetic body is used.

Examples of the soft magnetic bods include a single metal body containing one kind of metal element in a state of a pure material and an alloy body which is a eutectic (mixture) of one or more kinds of metal element (first metal element) and one or more kinds of metal element (second metal element) and/or non-metal element (carbon, nitrogen, silicon, phosphorus, or the like). These may be used alone or in combination of two or more.

An example of the single metal body includes a metal single body consisting of only one kind of metal element (first metal element). The first metal element is, for example, appropriately selected from iron (Fe), cobalt (Co), nickel (Ni), and another metal element that can be included as the first metal element of the soft magnetic body.

Further, examples of the single metal body include an embodiment including a core including only one kind of metal element and a surface layer including an inorganic material and/or an organic material which modify/modifies a portion of or the entire surface of the core, and an embodiment in which an organic metal compound and an inorganic metal compound including the first metal element are decomposed (thermally decomposed or the like). More specifically, an example of the latter embodiment includes an iron powder (may be referred to as a carbonyl iron powder) in which an organic iron compound (specifically, carbonyl iron) including iron as the first metal element is thermally decomposed. The position of a layer including the inorganic material and/or the organic material modifying a portion including only one kind of metal element is not limited to the surface described above. The organic metal compound and the inorganic metal compound that can obtain the single metal body are not particularly limited, and can be appropriately selected from a known or conventional organic metal compound and inorganic metal compound that can obtain the single metal body of the soft magnetic body.

The alloy body is not particularly limited as long as it is a eutectic of one or more kinds of metal element (first metal element) and one or more kinds of metal element (second metal element) and/or non-metal element (carbon, nitrogen, silicon, phosphorus, or the like) and can be used as an alloy body of a soft magnetic body.

The first metal element is an essential element in the alloy body, and examples thereof include iron (Fe), cobalt (Co), and nickel (Ni). When the first metal element is Fe, the alloy body is referred to as a Fe-based alloy; when the first metal element is Co. the alloy body is referred to as a Co-based alloy; and when the first metal element is Ni, the alloy body is referred to as a Ni-based alloy.

The second metal element is an element (auxiliary component) which is auxiliary included in the alloy body, and is a metal element which is compatible (eutectic) with the first metal element. Examples thereof include iron (Fe) (when the first metal element is other than Fe), cobalt (Co) (when the first metal element is other than Co), nickel (Ni) (when the first metal element is other than Ni), chromium (Cr), aluminum (Al), silicon (Si), copper (Cu), silver (Ag), manganese (Mn), calcium (Ca), barium (Ba), titanium (Ti), zirconium (Zr), hafnium (Hf), vanadium (V), niobium (Nb), tantalum (Ta), molybdenum (Mo), tungsten (W), ruthenium (Ru), rhodium (Rh), zinc (Zn), gallium (Ga), indium (In), germanium (Ge), tin (Sn), lead (Pb), scandium (Sc), yttrium (Y), strontium (Sr), and various rare earth elements. These may be used alone or in combination of two or more.

The non-metal element is an element (auxiliary component) which is auxiliary included in the alloy body and is a non-metal element which is compatible (eutectic) with the first metal element, and examples thereof include boron (B), carbon (C), nitrogen (N), silicon (Si), phosphorus (P), and sulfur (S). These may be used alone or in combination of two or more.

Examples of the Fe-based alloy which is one example of an alloy body include magnetic stainless steel (Fe—Cr—Al—Si alloy) (including electromagnetic stainless steel), Sendust (Fe—Si—Al alloy) (including Supersendust), permalloy (Fe—Ni alloy), Fe—Ni—Mo alloy, Fe—Ni—Mo—Cu alloy, Fe—Ni—Co alloy, Fe—Cr alloy, Fe—Cr—Al alloy, Fe—Ni—Cr alloy, Fe—Ni—Cr—Si alloy, silicon copper (Fe—Cu—Si alloy), Fe—Si alloy, Fe—Si—B(—Cu—Nb) alloy. Fe—B—Si—Cr alloy. Fe—Si—Cr—Ni alloy, Fe—Si—Cr alloy. Fe—Si—Al—Ni—Cr alloy, Fe—Ni—Si—Co alloy, Fe—N alloy. Fe—C alloy, Fe—B alloy, Fe—P alloy, ferrite (including stainless steel-based ferrite, and furthermore, soft ferrite such as Mn—Mg-based ferrite, Mn—Zn-based ferrite, Ni—Zn-based ferrite. Ni—Zn—Cu-based ferrite, Cu—Zn-based ferrite, and Cu—Mg—Zn-based ferrite), Permendur (Fe—Co alloy), Fe—Co—V alloy, and Fe-based amorphous alloy.

Examples of the Co-based alloy which is one example of an alloy body include Co—Ta—Zr and a cobalt (Co)-based amorphous alloy.

An example of the Ni-based alloy which is one example of an alloy body includes a Ni—Cr alloy.

A more detailed formulation of the above-described magnetic composition is described in Japanese Unexamined Patent Publication No. 2014-165363 or the like.

The lower limit of a volume ratio of the magnetic particles in the magnetic composition is, for example, 40% by volume, preferably 50% by volume, more preferably 60% by volume, and the upper limit thereof is, for example, 95% by volume, preferably 90% by volume.

The lower limit of a thickness of the inductor 2 is, for example, 30 μm, preferably 40 μm, and the upper limit of the thickness of the inductor 2 is, for example, 2,500 μm, preferably 2,000 μm.

The lower limit of a ratio of the thickness of the inductor 2 to the thickness of the mark-including laminated sheet 1 is, for example, 0.1, preferably 0.3, more preferably 0.7, and the upper limit thereof is, for example, 0.999, preferably 0.990, more preferably 0.980.

The mark layer 3 is a layer in which the mark 4 to be described next is formed. The mark layer 3 has a sheet shape extending in the plane direction Specifically, the mark layer 3 has the same outer shape as the mark-including laminated sheet 1 when viewed from the top. The mark layer 3 is disposed on the one surface 9 of the magnetic layer 8. Specifically, the mark layer 3 is in contact with the entire one surface 9.

A material for the mark layer 3 is not particularly limited, and examples thereof include a resin composition, a metal, and ceramics, and preferably, a resin composition is used. When the material for the mark layer 3 is a resin composition, it is easy to form the mark 4 to be described next.

The resin composition contains, for example, a resin as an essential component and contains particles as an optional component.

Examples of the resin include curable resins such as a thermosetting resin and an active energy ray-curable resin, and plastic resins such as a thermoplastic resin.

As the curable resin, preferably, a thermosetting resin is used. The thermosetting resin includes a main agent, a curing agent, and a curing accelerator.

Examples of the main agent include an epoxy resin and a silicone resin, and preferably, an epoxy resin is used. Examples of the epoxy resin include bifunctional epoxy resins such as a bisphenol A epoxy resin, a bisphenol F epoxy resin, a bisphenol S epoxy resin, a modified bisphenol A epoxy resin, a modified bisphenol F epoxy resin, a modified bisphenol S epoxy resin, and a biphenyl epoxy resin; and trifunctional or more polyfunctional epoxy resins such as a phenol novolac epoxy resin, a cresol novolac epoxy resin, a trishydroxyphenylmethane epoxy resin, a tetraphenylol ethane epoxy resin, and a dicyclopentadiene epoxy resin. These epoxy resins may be used alone or in combination of two or more. Preferably, a bifunctional epoxy resin is used, more preferably, a bisphenol A epoxy resin is used.

The lower limit of an epoxy equivalent of the epoxy resin is, for example, 10 g/eq., and the upper limit thereof is, for example, 1.000 g/eq.

When the main agent is the epoxy resin, examples of the curing agent include a phenol resin and an isocyanate resin Examples of the phenol resin include polyfunctional phenol resins such as a phenol novolac resin, a cresol novolac resin, a phenol aralkyl resin, a phenol biphenylene resin, a dicyclopentadiene phenol resin, and a resol resin. These may be used alone or in combination of two or more. As the phenol resin, preferably, a phenol novolac resin and a phenol biphenylene resin are used. When the main agent is the epoxy resin and the curing agent is the phenol resin, the lower limit of the total sum of hydroxyl groups in the phenol resin is, for example, 0.7 equivalents, preferably 0.9 equivalents, and the upper limit thereof is, for example, 1.5 equivalents, preferably 1.2 equivalents with respect to 1 equivalent of epoxy groups in the epoxy resin. Specifically, the lower limit of the number of parts by mass of the curing agent is, for example, 1 part by mass, and the upper limit thereof is, for example, 50 parts by mass with respect to 100 parts by mass of the main agent.

The curing accelerator is a catalyst (thermosetting catalyst) which promotes curing of the main agent (preferably, epoxy resin curing accelerator), and examples thereof include an organic phosphorus compound, and an imidazole compound such as 2-phenyl-4-methyl-5-hydroxymethylimidazole (2P4MHZ). The lower limit of the number of parts by mass of the curing accelerator is, for example, 0.05 parts by mass, and the upper limit thereof is, for example, 5 parts by mass with respect to 100 parts by mass of the main agent.

Examples of the thermoplastic resin include an acrylic resin, a polyester resin, and a thermoplastic polyurethane resin. Further, as the thermoplastic resin, a hydrophilic polymer is also used.

As the resin, any of a curable resin and a plastic resin can be used alone, or they can be used in combination of two or more.

The lower limit of a mass ratio of the resin in the resin composition is, for example, 10% by mass, preferably 30% by mass, and the upper limit thereof is, for example, 90% by mass, preferably 75% by mass.

The particles are at least one kind selected from the group consisting of first particles and second particles.

The first particles have, for example, a generally spherical shape. The lower limit of the median diameter of the first particles is, for example, 1 μm, preferably 5 μm, and the upper limit of the median diameter of the first particles is, for example, 250 μm, preferably 200 μm. The median diameter of the first particles is determined with a laser diffraction particle size distribution measuring device. The median diameter of the first particles can be also determined, for example, by binarization process by cross-sectional observation.

A material for the first particles is not particularly limited Examples of the material for the first particles include metals, an inorganic compound, an organic compound, and a single body of a non-metal element, and from the viewpoint of reliably forming the mark 4, preferably, an inorganic compound and a single body of a non-metal element are used.

The inorganic compound is included in the resin composition when the mark layer 3 functions as an ink receiving layer. An example of the inorganic compound includes an inorganic filler, and specifically, silica and alumina are used, preferably, silica is used.

The single body of a non-metal element is included in the resin composition when the mark laver 3 functions as a laser discoloration layer. Examples of the single body of a non-metal element include carbon and silicon, and preferably, carbon is used, more preferably, carbon black is used.

Specifically, as the first particles, preferably, spherical silica is used, and preferably, spherical carbon black is used.

The second particles have, for example, a generally flat shape. The generally flat shape includes a generally plate shape.

The lower limit of a flat ratio (flat degree) of the second particles is, for example, 8, preferably 15, and the upper limit thereof is, for example, 500, preferably 450. The flat ratio of the second particles is determined by the same calculation method as the flat ratio of the magnetic particles in the magnetic layer 8 described above.

The lower limit of the median diameter of the second particles is, for example, 1 μm, preferably 5 μm, and the upper limit of the median diameter of the second particles is, for example, 250 μm, preferably 200 μm. The median diameter of the second particles is determined in the same manner as that of the first particles.

The lower limit of the average thickness of the second particles is, for example, 0.1 μm, preferably 0.2 μm, and the upper limit thereof is, for example, 3.0 μm, preferably 2.5 μm.

A material for the second particles is an inorganic compound. An example of the inorganic compound includes a thermally conductive compound such as boron nitride.

Specifically, as the second particles, preferably, a flat-shaped boron nitride is used.

One kind or both of the first particles and the second particles are included in the resin composition.

The lower limit of the number of parts by mass of the particles (first particles and/or second particles) is, for example, 10 parts by mass, preferably 50 parts by mass, and the upper limit thereof is, for example, 2,000 parts by mass, preferably 1,500 parts by mass with respect to 100 parts by mass of the resin. Further, the lower limit of a content ratio of the particles in the resin composition is, for example, 10% by mass, and the upper limit thereof is, for example, 90% by mass. When both of the first particles and the second particles are included in the resin composition, the lower limit of the number of parts by mass of the second particles is, for example, 30 parts by mass, and the upper limit thereof is, for example, 300 parts by mass with respect to 100 parts by mass of the first particles.

Since the particles are an optional component in the resin composition, the resin composition may not include the particles.

The lower limit of a thickness of the mark layer 3 is, for example, 1 μm, preferably 10 μm, and the upper limit thereof is, for example, 1.000 μm, preferably 100 μm. The lower limit of a ratio of the thickness of the mark layer 3 in the thickness of the mark-including laminated sheet 1 is, for example, 0.001, preferably 0.005, more preferably 0.01, and the upper limit thereof is, for example, 0.5, preferably 0.3, more preferably 0.1.

The mark 4 is, for example, a mark for notifying the positional information of the plurality of wirings 7 in the inductor 2. The mark 4 is an alignment mark for forming a via 16 in the mark-including laminated sheet 1.

The mark 4 is formed in the mark layer 3. Specifically, the mark 4 is disposed on one surface in the thickness direction of the mark layer 3. Each of the marks 4 is, for example, formed in each four corner portion 6 partitioned by the four sides 5 of the mark layer 3. The mark 4 has, for example, a generally cross shape when viewed from the top.

Further, the mark 4 is a recessed portion that proceeds from one surface in the thickness direction of the mark layer 3 toward the other side in the thickness direction to the middle in the thickness direction.

Further, the mark 4 is separated outwardly in a direction in which the plurality of wirings 7 are adjacent to each other when projected in the thickness direction. That is, the mark 4 is not overlapped with the plurality of wirings 7 when projected in the thickness direction, and deviates with respect to the plurality of wirings 7. The lower limit of the shortest distance L, between the mark 4 and the wiring 7 is, for example, 10 μm, preferably 50 μm, and the upper limit thereof is, for example, 10 mm, preferably 5 mm, more preferably 3 mm.

A dimension of the mark 4 is not particularly limited. The lower limit of a length of the mark 4 in a direction in which the wiring 7 extends is, for example, 10 μm, preferably 50 μm, more preferably 300 μm, and the upper limit thereof is, for example, 5 mm, preferably 2 mm, more preferably 1 mm. The lower limit of the length of the mark 4 in a direction in which the plurality of wirings 7 are adjacent to each other is, for example, 10 μm, preferably 50 μm, more preferably 300 μm, and the upper limit thereof is, for example, 5 mm, preferably 2 mm, more preferably 1 mm. When the above-described dimension of the mark 4 is the above-described lower limit or more, it is possible to reliably read the mark 4 as an alignment mark. When the above-described dimension of the mark 4 is the above-described upper limit or less, it is possible to miniaturize the mark-including laminated sheet 1.

The lower limit of a depth of the mark 4 is, for example, 1 μm, preferably 5 μm, and the upper limit thereof is 1 mm. The lower limit of a ratio of the depth of the mark 4 to the thickness (depth) of the mark layer 3 is, for example, 0.01, preferably 0.1, and the upper limit thereof is, for example, 0.9, preferably 0.7.

Next, a method for producing the above-described mark-including laminated sheet 1 and a processing embodiment thereof are described with reference to FIGS. 1A to 2D.

Figure 2A:
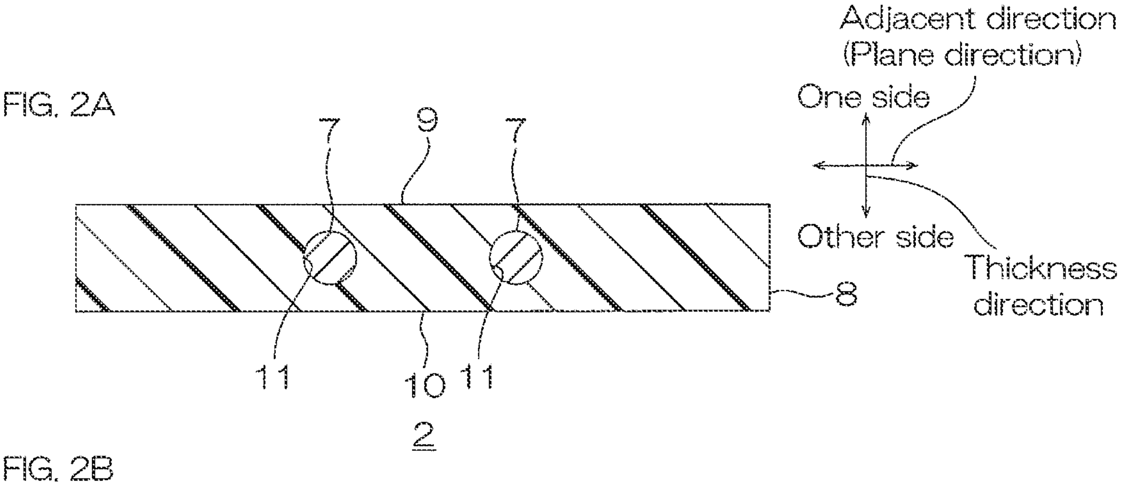
FIGS. 2A to 2D show front cross-sectional views for illustrating a method for producing one embodiment of a mark-including laminated sheet of the present invention.

In this method, first, as shown in FIG. 2A, the inductor 2 is prepared. The inductor 2 is, for example, prepared by a method described in Japanese Unexamined Patent Publication No. 2019-220618 or the like.

Figure 2B:
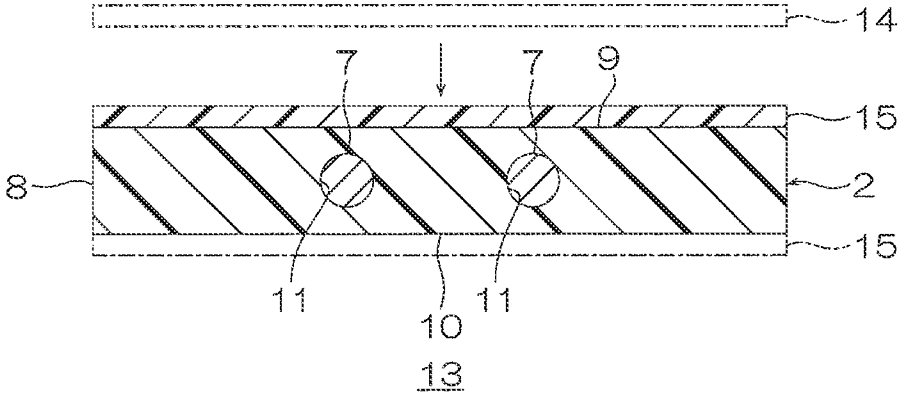

Then, in this method, as shown in FIGS. 1A and 2B, a mark formable layer 15 is disposed on one surface in the thickness direction of the inductor 2.

The mark formable layer 15 is a layer in which the mark 4 is not yet provided, and a layer capable of forming the mark 4 in the next step. A material for the mark formable layer 15 is the same as that for the mark layer 3. To dispose the mark formable layer 15 in the inductor 2, first, a mark formable sheet 14 is prepared. The mark formable sheet 14 is a sheet before the mark formable layer 15 is disposed with respect to the one surface 9 of the inductor 2, and a material thereof is the same as that of the mark layer 3. To prepare the mark formable sheet 14, a solvent is further blended into the above-described material to prepare a varnish, and the obtained varnish is applied to the surface of a release sheet (not shown) to be dried. When the resin contains a thermosetting resin, the thermosetting resin is in a B-stage state or a C-stage state.

Subsequently, the mark formable sheet 14 is attached to one surface in the thickness direction of the inductor 2. Specifically, the other surface in the thickness direction of the mark formable sheet 14 is brought into contact with one surface in the thickness direction of the inductor 2. Thus, the mark formable sheet 14 is formed in the mark formable layer 15 in a state of being in contact with the one surface 9.

Thereafter, when the resin contains a thermosetting resin in a B-stage state, the thermosetting resin is brought into a C-stage state by beating.

Thus, the mark formable layer 15 is disposed (laminated) on one surface in the thickness direction of the inductor 2. Preferably, the mark formable layer 15 adheres to the one surface 9 of the magnetic layer 8.

Thus, a laminated sheet 13 including the inductor 2 and the mark formable layer 15 is fabricated. The laminated sheet 13 is not yet provided with the mark 4, and is a component for producing the mark-including laminated sheet 1. The laminated sheet 13 is an industrially available device which can be distributed alone.

Figure 2C:
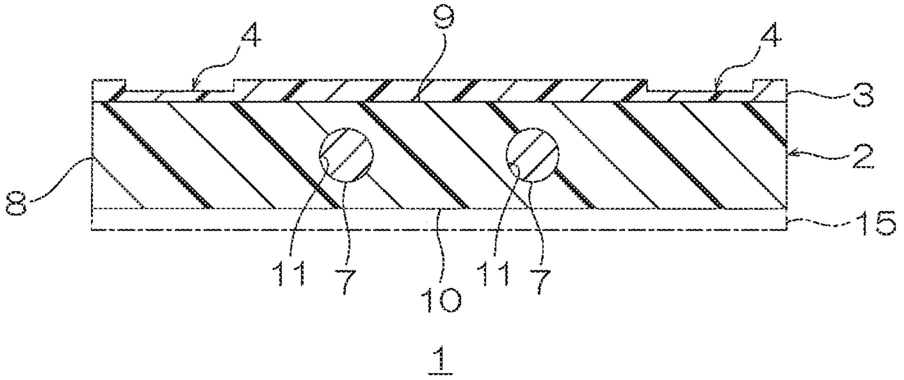

Thereafter, in this method, as shown in FIGS. 1B and 2C, the mark 4 is formed in the mark formable layer 15.

A forming method of the mark 4 is not particularly limited, and examples thereof include drilling, punching in shear, physical polishing (for example, sandblasting etc.), and chemical etching.

Thus, the mark formable layer 15 becomes the mark layer 3 in which the mark 4 is formed. Thus, the mark-including laminated sheet 1 including the inductor 2, the mark layer 3, and the mark 4 is obtained.

The mark-including laminated sheet 1 satisfies, for example, at least one test of the test (a) to test (e).

Test (a): the mark-including laminated sheet 1 is trimmed into a 3 cm square piece to fabricate a sample, and the relative permeability μ1 thereof at a frequency of 10 Miz is determined. Thereafter, the sample is immersed in 200 mL of copper sulfate plating solution containing 66 g/L of copper sulfate pentahydrate, 180 g/L of sulfuric acid concentration, 50 ppm of chlorine, and Top Lutina alpha manufactured by OKUNO CHEMICAL INDUSTRIES CO., LTD. at 25° C. for 120 minutes, and thereafter, the relative permeability μ2 of the sample at a frequency of 10 MHz is determined By the following formula, a rate of change of the magnetic permeability before and after the immersion is determined. As a result, the rate of change of the magnetic permeability of the sample is 5% or less.

$$\text{Rate of Change of Magnetic Permeability (\%)}=|\mu1-\mu2|/\mu1\times100$$

Test (b): the mark-including laminated sheet 1 is trimmed into a 3 cm square piece to fabricate a sample, and the relative permeability μ3 thereof at a frequency of 10 MHz is determined. Thereafter, the sample is immersed in 200 mL of an acid active aqueous solution containing 55 g/L of sulfuric acid at 25° C. for 1 minute, and thereafter, the relative permeability μ4 of the sample at a frequency of 10 MHz is determined. By the following formula, a rate of change of the magnetic permeability before and after the immersion is determined. As a result, the rate of change of the magnetic permeability of the sample is 5% or less.

$$\text{Rate of Change of Magnetic Permeability (\%)}=|\mu3-\mu4|/\mu3\times100$$

Test (c): the mark-including laminated sheet 1 is trimmed into a 3 cm square piece to fabricate a sample, and the relative permeability μ5 thereof at a frequency of 10 MHz is determined. Thereafter, the sample is immersed in 200 mL of Reduction Solution Securiganth P manufactured by Atotech Japan K.K. at 45° C. for 5 minutes, and thereafter, the relative permeability μ6 of the sample at a frequency of 10 MHz is determined. By the following formula, a rate of change of the magnetic permeability before and after the immersion is determined. As a result, the rate of change of the magnetic permeability of the sample is 5% or less.

$$\text{Rate of Change of Magnetic Permeability (\%)}=|\mu5-\mu6|/\mu5\times100$$

Test (d): the mark-including laminated sheet 1 is trimmed into a 3 cm square piece to fabricate a sample, and the relative permeability μ7 thereof at a frequency of 10 MHz is determined. Thereafter, the sample is immersed in 200 mL of Concentrate Compact CP manufactured by Atotech Japan K.K. at 80° C. for 15 minutes, and thereafter, the relative permeability μ8 of the sample at a frequency of 10 MHz is determined. By the following formula, a rate of change of the magnetic permeability before and after the immersion is determined. As a result, the rate of change of the magnetic permeability of the sample is 5% or less.

$$\text{Rate of Change of Magnetic Permeability (\%)}=|\mu7-\mu8|/\mu7\times100$$

Test (e): the mark-including laminated sheet 1 is trimmed into a 3 cm square piece to fabricate a sample, and the relative permeability μ9 thereof at a frequency of 10 MHz is determined. Thereafter, the sample is immersed in 200 mL of Swelling Dip Securiganth P manufactured by Atotech Japan K.K. at 60° C. for 5 minutes, and thereafter, the relative permeability μ10 of the sample at a frequency of 10 MHz is determined. By the following formula, a rate of change of the magnetic permeability before and after the immersion is determined. As a result, the rate of change of the magnetic permeability of the sample is 5% or less.

$$\text{Rate of Change of Magnetic Permeability (\%)}=|\mu9-\mu10|/\mu9\times100$$

When the test (a) is satisfied, the upper limit of the rate of change of the magnetic permeability of the sample in the test (a) is preferably 4%, more preferably 3%.

When the test (a) is satisfied, the mark-including laminated sheet 1 is excellent in stability with respect to the immersion of the copper sulfate solution of the electrolytic copper plating.

When the test (b) is satisfied, the upper limit of the rate of change of the magnetic permeability of the sample in the test (b) is preferably 4%, more preferably 3%.

When the test (b) is satisfied, the mark-including laminated sheet 1 is excellent in stability with respect to the immersion of the acid active solution.

When the test (c) is satisfied, the upper limit of the rate of change of the magnetic permeability of the sample in the test (c) is preferably 4%, more preferably 3%.

Reduction Solution Securiganth P manufactured by Atotech Japan K.K. in the test (c) includes a sulfuric acid aqueous solution, and is used as a neutralizing solution (neutralizing agent or an aqueous solution for neutralization). Therefore, when the test (c) is satisfied, the mark-including laminated sheet 1 is excellent in stability with respect to the immersion of the neutralizing solution.

When the test (d) is satisfied, the upper limit of the rate of change of the magnetic permeability of the sample in the test (d) is preferably 4%, more preferably 3%.

Concentrate Compact CP manufactured by Atotech Japan K.K. in the test (d) includes a potassium permanganate solution. Therefore, when the test (d) is satisfied, the mark-including laminated sheet 1 is excellent in stability with respect to the immersion of the potassium permanganate solution of desmear (cleaning).

When the test (e) is satisfied, the upper limit of the rate of change of the magnetic permeability of the sample in the test (e) is preferably 4%, more preferably 3%.

Swelling Dip Securiganth P manufactured by Atotech Japan K.K. in the test (e) is an aqueous solution containing glycol ethers and sodium hydroxide, and is used as a swelling solution. Therefore, when the test (e) is satisfied, the mark-including laminated sheet 1 is excellent in stability with respect to the immersion of the swelling solution.

Preferably, all of the test (a) to test (e) are satisfied. Therefore, the mark-including laminated sheet 1 is excellent in stability with respect to the immersion of the copper sulfate solution of the electrolytic copper plating, the acid active solution, the neutralizing solution, the potassium permanganate solution of the desmear (cleaning), and the swelling solution, and is excellent in stability with respect to various processes using these solutions.

Figure 2D:
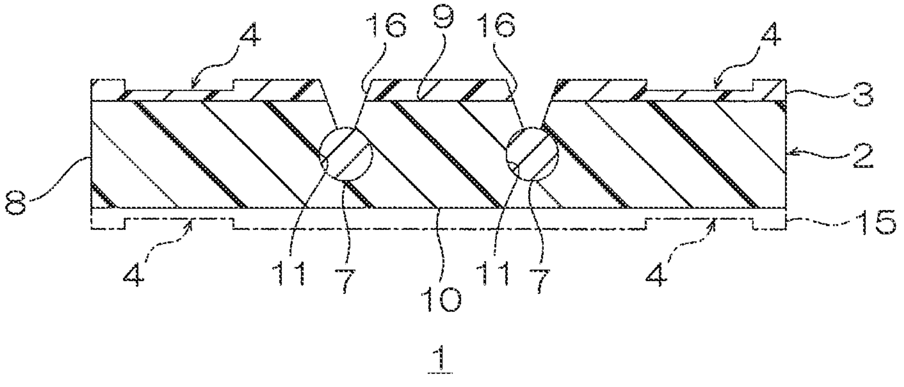

As shown in FIGS. 1C and 2D, thereafter, the via 16 is formed in the mark-including laminated sheet 1.

In the formation of the via 16, for example, the mark 4 is used as an alignment mark to align the mark-including laminated sheet 1. For example, (the position of) the mark 4 is recognized (read) with a recognition device disposed at one side in the thickness direction of the mark-including laminated sheet 1, and the position in the plane direction of the mark-including laminated sheet 1 with respect to a device for carrying out the next processing is adjusted with the mark 4 as a reference.

The forming method of the via 16 is not particularly limited and examples thereof include contact-type opening such as drilling and sandblasting and non-contact-type processing using a laser.

The via 16 is, for example, overlapped with the wiring 7 when viewed from the top. Specifically, the via 16 is a through hole which exposes the central portion of one surface in the thickness direction of the wiring 7 and penetrates the magnetic layer 8 and the mark layer 3 in the thickness direction located at one side in the thickness direction with respect to the wiring 7. The via 16 has a generally circular shape when viewed from the top (not shown). The via 16 also has a tapered shape in which the opening area expands toward one side in the thickness direction when viewed in the cross-sectional view. Or, though not shown, the via 16 may also have a straight shape in which the opening cross-sectional area is the same at one side in the thickness direction when viewed in the cross-sectional view.

Thereafter, the mark-including laminated sheet 1 in which the via 16 is formed is, for example, subjected to steps such as photolithography and plating (copper plating etc.), and an electrically conductive layer which is not shown is formed in the wiring 7 exposed from the via 16 to be mounted and bonded to an electronic device or an electronic component. The electronic device or the electronic component is electrically connected to the wiring 7 through the via 16.

Function and Effect of One Embodiment

Since the mark-including laminated sheet 1 includes the mark 4, it is possible to form the via 16 by aligning the mark-including laminated sheet 1 based on the mark 4.

Furthermore, since the mark-including laminated sheet 1 includes the mark layer 3, it is possible to reliably include the mark 4.

Although not shown, when the mark 4 is oppositely disposed at one side in the thickness direction of the wiring 7, there is a case where the position of the mark 4 deviates due to the presence of the wiring 7.

However, in the mark-including laminated sheet 1, the mark 4 is spaced apart from the wiring 7. That is, the mark 4 is not oppositely disposed at one side in the thickness direction of the wiring 7. Therefore, the mark 4 is formed without positional deviation due to the presence of the wiring 7. Therefore, it is possible to more accurately align the mark-including laminated sheet 1.

Furthermore, in the mark-including laminated sheet 1, when the material for the mark layer 3 is the resin composition, it is easy to form the mark 4.

Modified Examples

In the following modified examples, the same reference numerals are provided for members and steps corresponding to each of those in the above-described one embodiment, and their detailed description is omitted. Further, each of the modified examples can achieve the same function and effect as that of one embodiment unless otherwise specified. Furthermore, one embodiment and the modified examples thereof can be appropriately used in combination.

A shape of the mark 4 is not limited to the description above. Although not shown, examples of the shape of the mark 4 include a generally V-shape, a generally X-shape, a generally L-shape, a generally I-shape (including a generally linear shape), a generally U-shape, a generally C-shape, a generally circular ring shape (including a generally elliptical ring shape), a generally circular shape (including a generally elliptical shape), a generally polygonal frame shape (including a generally triangular frame shape and a generally rectangular frame shape), and a generally polygonal shape (including a generally triangular shape and a generally rectangular shape).

The position of the mark 4 is not particularly limited, and for example, though not shown, the mark 4 may be located between the wirings 7 adjacent to each other.

Figure 3:
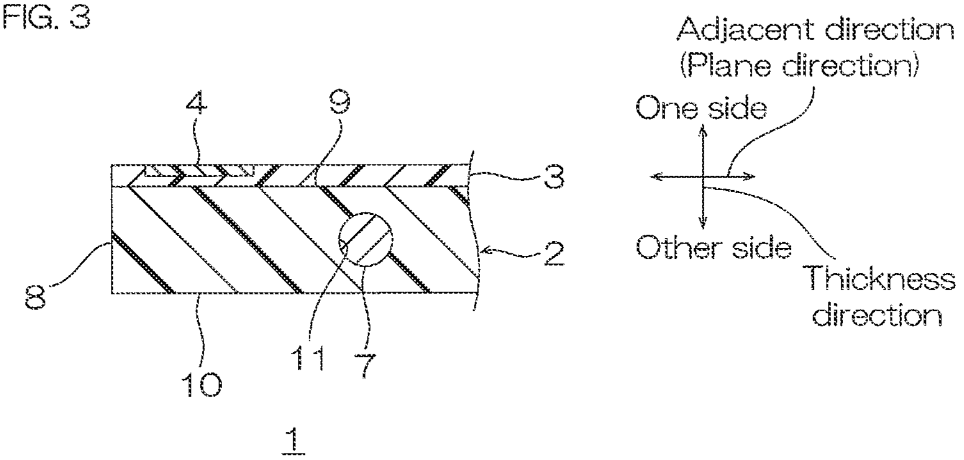
FIG. 3 shows an enlarged cross-sectional view of a modified example of a mark of the mark-including laminated sheet shown in FIG. 2C.

As shown in FIG. 3, the mark formable layer 15 may be a laser discolorable layer and/or an ink receptable layer.

When the mark formable layer 15 is a laser discolorable layer, both of the laser discolorable layer and the mark layer 3 include, for example, a thermosetting resin as a resin and spherical carbon black as the first particles, and have, for example, a black color. When the laser is applied to the laser discolorable laser, the first particles (carbon black) in the applied portion are thermally decomposed and removed, and the blackness of the portion becomes low (the color becomes pale) (discolored). Thus, the mark formable layer 15 becomes the mark layer 3 having the discolored mark 4.

When the mark formable layer 15 is an ink receptable layer, the ink receptable layer and the mark layer 3 include, for example, a hydrophilic polymer as a resin and spherical silica as the first particles. An ink (not shown) is printed on the mark formable layer 15, and thereafter, the hydrophilic polymer and the silica of the mark formable layer 15 absorb (have affinity to) the ink. Thus, the mark formable layer 15 becomes the mark layer 3 having the colored mark 4.

Figure 4:
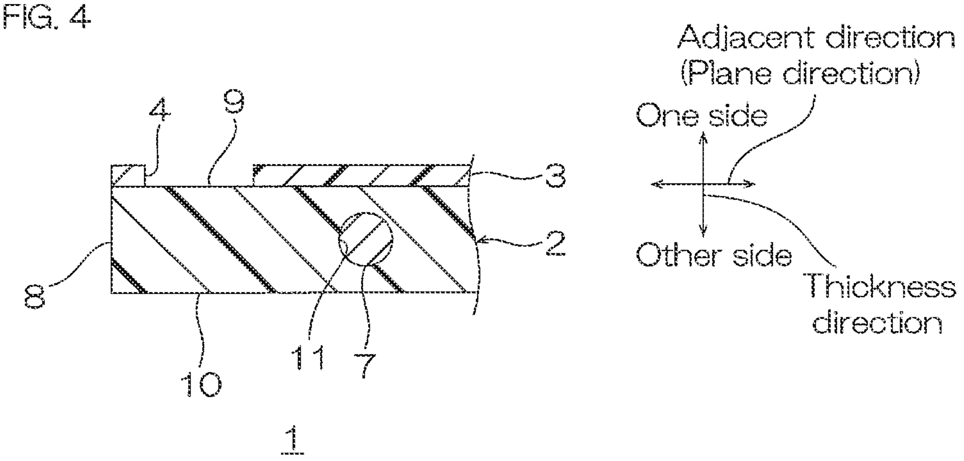
FIG. 4 shows an enlarged cross-sectional view of a modified example of a mark of the mark-including laminated sheet shown in FIG. 2C.

As shown in FIG. 4, the mark 4 may be a through hole penetrating the mark layer 3.

Figure 5:
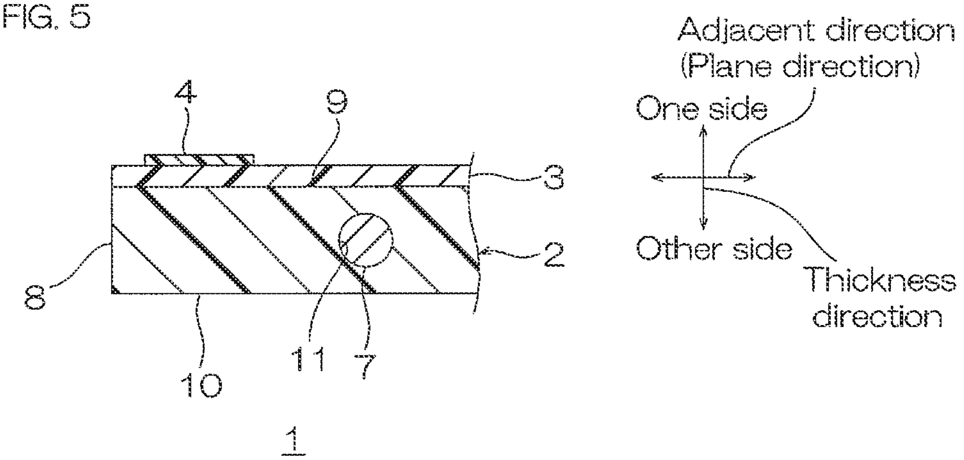
FIG. 5 shows an enlarged cross-sectional view of a modified example of a mark of the mark-including laminated sheet shown in FIG. 2C.

As shown in FIG. 5, the mark 4 may be also disposed on one surface in the thickness direction of the mark layer 3. The mark 4 is made of, for example, a solid material of the ink (preferably, a cured product such as an ultraviolet curable product).

Figure 6:
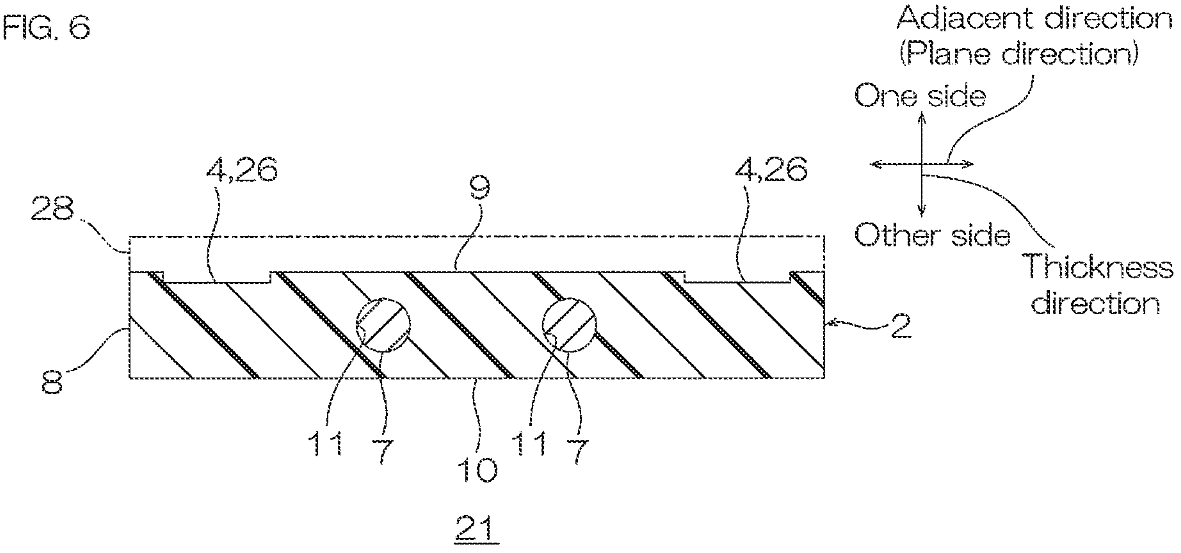
FIG. 6 shows a front cross-sectional view of one embodiment of a mark-including inductor of the present invention.
Figure 7:
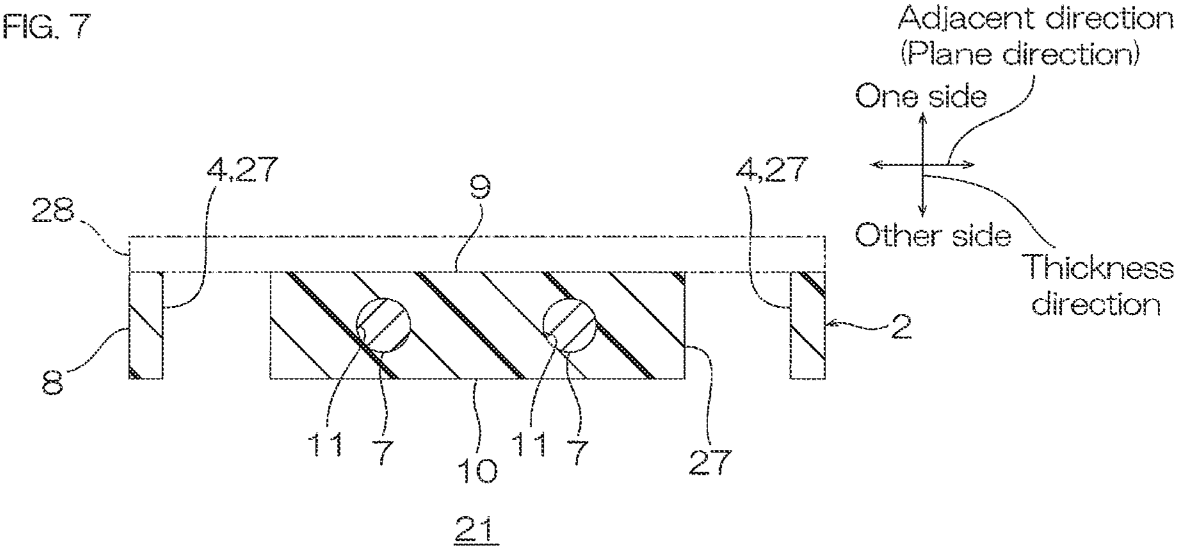
FIG. 7 shows a plan view of a modified example of the mark-including inductor shown in FIG. 6.
Figure 8:
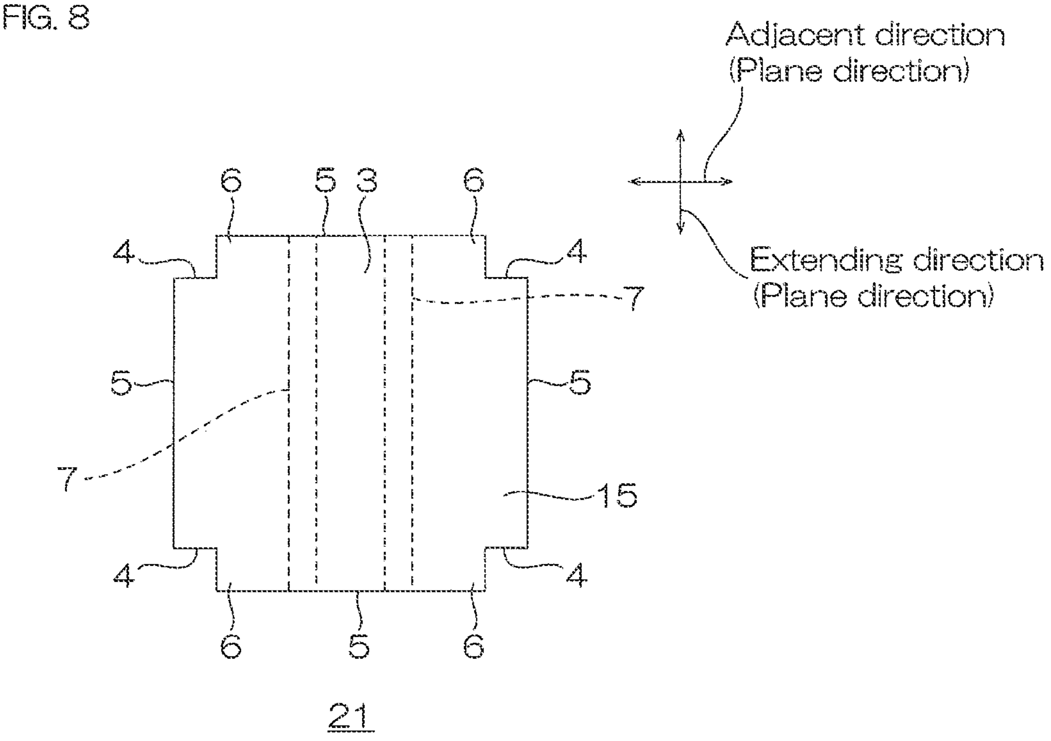
FIG. 8 shows a plan view of a modified example of the mark-including inductor shown in FIG. 6.

As shown in FIGS. 6 to 8, the mark 4 can be also formed directly on the inductor 2 rather than on the mark layer 3. In this modified example, the inductor 2 and the mark 4 are included in a mark-including inductor 21. Specifically, the mark-including inductor 21 includes only the inductor 2 and the mark 4 without including the mark layer 3. The mark-including inductor 21 is not the mark-including laminated sheet 1.

In the mark-including inductor 2I of the modified example shown in FIG. 6, the mark 4 is formed on the one surface 9 of the inductor 2. The mark 4 is a magnetic recessed portion 26 which goes from the one surface 9 of the magnetic layer 8 toward the other side to the middle in the thickness direction. The dimension when viewed from the top of the magnetic recessed portion 26 is the same as that of the mark 4 in one embodiment.

In the mark-including inductor 21 of the modified example shown in FIG. 7, the mark 4 is a through hole 27 penetrating the inductor 2 in the thickness direction. More specifically, the through hole 27 penetrates the magnetic layer 8 in the thickness direction. The dimension when viewed from the top of the through hole 27 is the same as that of the mark 4 in one embodiment.

Examples of a forming method of the magnetic recessed portion 26 shown in FIG. 6 and the through hole 27 shown in FIG. 7 include contact-type processing such as drilling and sandblast and non-contact-type processing using a laser. Preferably, from the viewpoint of short processing time, contact-type processing is used, more preferably, drilling is used.

Also, for example, an insulating layer 28 shown by a phantom line can be disposed on the one surface 9 in the thickness direction of the magnetic layer 8 shown in FIGS. 6 and 7. The insulating layer 28 is in contact with the one surface 9 in the thickness direction of the magnetic layer 8. The insulating layer 28 extends in the plane direction. An example of a material for the insulating layer 28 includes a resin composition illustrated in the material for the mark layer 3 in one embodiment. In FIG. 6, the insulating layer 28 fills the magnetic recessed portion 26. In FIG. 7, the insulating layer 28 closes one end edge in the thickness direction of the through hole 27. Although not shown, the through hole 27 may be also filled with a resin composition used in the insulating layer 28.

When the magnetic recessed portion 26 shown in FIG. 6 is compared with the through hole 27 shown in FIG. 7, the through hole 27 shown in FIG. 7 is preferable. In the modified example in FIG. 7, it is possible to ensure the visibility from the other side in the thickness direction in the formation of the insulating layer 28 shown by the phantom line.

Although not shown, the mark 4 can be provided in both the mark layer 3 and the inductor 2.

In the mark-including inductor 21 of the modified example shown in FIG. 8, the mark 4 is formed by cutting out the corner portion 6 (ref: FIG. 6) of the inductor 2. The mark 4 is formed by cutting out the corner portion 6 into a rectangular shape in the thickness direction.

Figure 9:
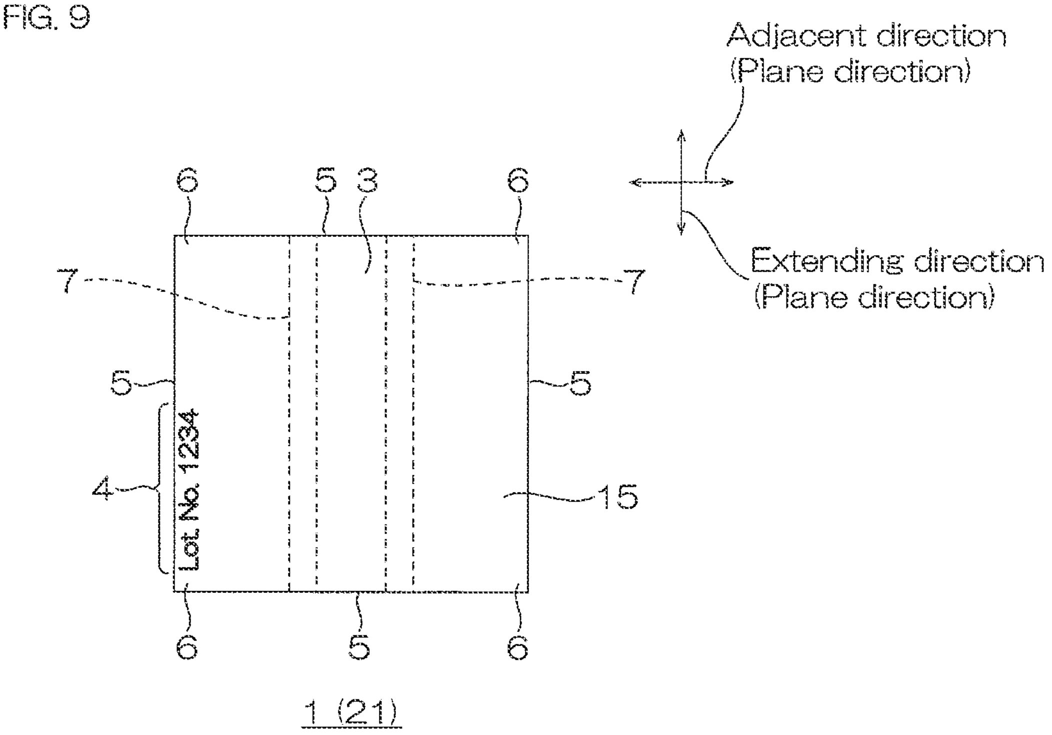
FIG. 9 shows a plan view of a modified example (modified example in which a mark is a lot number) of the mark-including laminated sheet shown in FIG. 1B.

As shown in FIG. 9, the mark 4 may also include information about the mark-including laminated sheet 1 (or the mark-including inductor 21) as a product instead of or together with the alignment mark Examples of the information include the lot number of the mark-including laminated sheet 1 and the magnetic permeability of the mark-including laminated sheet 1.

As shown by a dashed line of FIG. 2B, the mark formable layer 15 can be also formed on the one surface 9 and the other surface 10 of the inductor 2. In the modified example, as shown in FIG. 2C, the two mark layers 3 are disposed on each of the one surface 9 and the other surface 1*o*. The mark 4 is formed in each of the two mark layers 3.

In the following points, the modified example in which the mark 4 is formed in each of the two mark layers 3 is preferable as compared with one embodiment in which the mark 4 is formed only in the one mark layer 3.

In a case where the formation of the via 16 is necessary from both sides in the thickness direction of the mark-including laminated sheet 1, in the modified example described above, it is possible to make the formation surface of the via 16 and the recognition surface of the mark 4 the same. Therefore, the production efficiency can be improved. On the other hand, when the via 16 is formed in the one surface 9, and the mark 4 is formed in the other surface 10. i.e., when the formation surface of the via 16 and the recognition surface of the mark 4 are formed in different surfaces, it is necessary to turn over the mark-including laminated sheet 1 in the thickness direction, or recognize the mark 4 from the other side in the thickness direction, and the step of forming the via 16 becomes very complicated.

When a shape and/or a forming method of the mark 4 on one side and the mark 4 at the other side in the thickness direction are/is changed, both surfaces in the thickness direction of the mark-including laminated sheet 1 can be easily and reliably recognized.

When it is necessary to provide a large number of marks 4, it is possible to effectively use the space on both surfaces in the thickness direction of the mark-including laminated sheet 1. That is, when the free area is small in only one surface in the thickness direction, it is possible to effectively use the other surface.

When the position of the mark 4 at one side, and the position of the mark 4 at the other side in the thickness direction are the same when projected in the thickness direction, it is possible to obtain two information in one recognition process (imaging) by making the shape of these different and using a recognition device (for example, X-ray recognizing device) using energy rays transmitting through the mark-including laminated sheet 1. Thus, the production efficiency can be improved.

The mark-including laminated sheet 1 can be obtained by cutting a second mark-including laminated sheet (not shown) having a larger size than the mark-including laminated sheet 1 when viewed from the top. The second mark-including laminated sheet has a plurality of areas (not shown) corresponding to the mark-including laminated sheet 1 before cutting. Each of the plurality of areas is provided with the mark 4. The second mark-including laminated sheet (not shown) is cut by using the mark 4, so that the plurality of singulated mark-including laminated sheets 1 are obtained. In each of the plurality of areas of the second mark-including laminated sheet (not shown), the via 16 can be provided. The mark 4 is read with a cutting device, the area corresponding to the mark-including laminated sheet 1 is specified, and the second mark-including laminated sheet (not shown) is cut to be singulated. Both the mark-including laminated sheet 1 and the second mark-including laminated sheet (not shown) are included in the mark-including laminated sheet of the present invention.

The mark-including inductor 21 can be obtained by cutting a second mark-including inductor (not shown) having a larger size than the mark-including inductor 21 when viewed from the top. The second mark-including inductor has a plurality of areas (not shown) corresponding to the mark-including inductor 21 before cutting. Each of the plurality of areas is provided with the mark 4. The second mark-including inductor (not shown) is cut by using the mark 4, so that the plurality of singulated mark-including inductors 21 are obtained. The mark 4 is read with a cutting device, the area corresponding to the mark-including inductor 21 is specified, and the second mark-including inductor (not shown) is cut to be singulated. Both the mark-including inductor 21 and the second mark-including inductor (not shown) are included in the mark-including inductor of the present invention.

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

DESCRIPTION OF SYMBOLS

1 Mark-including laminated sheet
2 Inductor
4 Mark
7 Wiring
8 Magnetic layer
21 Mark-including inductor
27 Through hole

The invention claimed is:

1. A sheet-shaped inductor extending in a plane direction perpendicular to a thickness direction, and including an adjacent direction in which a plurality of wirings are adjacent to each other, and an extending direction in which the plurality of wirings extend, the extending direction being perpendicular to the adjacent direction, the sheet-shaped inductor comprising:

the plurality of wirings extending in the extending direction, and including a first wiring and a second wiring that is adjacent to the first wiring in the adjacent direction and parallel with the first wiring in the extending direction;

a magnetic layer embedding the first wiring and the second wiring;

a mark disposed on a one-side surface of the sheet-shaped inductor in the thickness direction; and a via being a through hole penetrating in the thickness direction from the one-side surface of the sheet-shaped inductor to a one-side surface of the first wiring and/or a one-side surface of the second wiring, wherein the via and the mark are adjacent to each other in the adjacent direction.

2. The sheet-shaped inductor according to claim 1, further comprising:

a mark layer in which the mark is disposed.

3. The sheet-shaped inductor according to claim 2, wherein a material for the mark layer is a resin composition.

4. The sheet-shaped inductor according to claim 3, wherein the resin composition includes an epoxy resin or an acrylic resin.

5. The sheet-shaped inductor according to claim 4, wherein the resin composition further includes an inorganic compound.

6. The sheet-shaped inductor according to claim 5, wherein the inorganic compound is an inorganic filler.

7. The sheet-shaped inductor according to claim 6, wherein the inorganic filler is silica or alumina.

8. The sheet-shaped inductor according to claim 4, wherein the resin composition further includes a curing agent.

9. The sheet-shaped inductor according to claim 2, wherein the mark is disposed on a one-side surface of the mark layer in the thickness direction.

10. The sheet-shaped inductor according to claim 2, wherein the mark includes a recessed portion that proceeds from the one-side surface of the mark layer toward an other side to a middle in the thickness direction.

11. The sheet-shaped inductor according to claim 2, wherein the mark includes a through hole penetrating the mark layer in the thickness direction.

12. The sheet-shaped inductor according to claim 1, wherein the magnetic layer contains magnetic particles.

13. The sheet-shaped inductor according to claim 1, wherein in the adjacent direction, an interval between the first wiring and the second wiring is 10 μm to 5000 μm.

14. The sheet-shaped inductor according to claim 1, wherein the via includes a plurality of first vias, each of which is a through hole penetrating from the one-side surface of the sheet-shaped inductor to the first wiring, and a plurality of second vias, each of which is a through hole penetrating from the one-side surface of the sheet-shaped inductor to the second wiring, wherein the first via and the second via are adjacent to each other in the adjacent direction, wherein the plurality of first vias are disposed while being spaced apart from each other in the extending direction, and wherein the plurality of second vias are disposed while being spaced apart from each other in the extending direction.

15. The sheet-shaped inductor according to claim 1, wherein when viewed in the thickness direction, the mark has a generally circular shape including an elliptical shape.

16. The sheet-shaped inductor according to claim 1, wherein when projected in the thickness direction, the mark is spaced away from the wiring in the adjacent direction, and wherein when projected in the thickness direction, a lower limit of a shortest distance L between the mark and the wiring in the adjacent direction is 10 μm.

17. The sheet-shaped inductor according to claim 1, wherein the first wiring and/or the second wiring are/is electrically connected to an electronic device or an electronic component through the via.

18. A method of producing a sheet-shaped inductor extending in a plane direction perpendicular to a thickness direction, and including an adjacent direction in which a plurality of wirings are adjacent to each other, and an extending direction in which the plurality of wirings extend, the extending direction being perpendicular to the adjacent direction, the method comprising:

a step of preparing an inductor including:

the plurality of wirings extending in the extending direction and including a first wiring and a second wiring that is adjacent to the first wiring in the adjacent direction and parallel with the first wiring in the extending direction, and a magnetic layer embedding the first wiring and the second wiring;

a step of disposing a mark formable layer on a one-side surface of the inductor in the thickness direction;

a step of forming a mark on a one-side surface of the mark formable layer to form a mark layer; and a step of forming a via in a position in which the via and the mark are adjacent to each other in the adjacent direction, the via being a through hole penetrating in the thickness direction from a one-side surface of the mark layer to the first wiring and/or the second wiring.

* * * * *